United States Patent
Abedor et al.

[19]

[11] Patent Number: 6,082,653
[45] Date of Patent: *Jul. 4, 2000

[54] SYSTEM FOR ESTIMATING TAPE PACK RADIUS USING A KALMAN FILTER

[75] Inventors: John Abedor, Palo Alto; Kurt Hallamasek, Oakland, both of Calif.

[73] Assignee: Ampex Corporation, Redwood City, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/740,637

[22] Filed: Oct. 31, 1996

[51] Int. Cl.[7] .............................. G11B 15/32; G11B 15/46
[52] U.S. Cl. ................... 242/357; 242/334.2; 242/334.3; 360/71; 360/73.01
[58] Field of Search .................... 242/357, 334.3, 242/334.2, 534, 538.1, 563; 360/71, 73.01

[56] References Cited

U.S. PATENT DOCUMENTS

| | | | |
|---|---|---|---|
| 3,834,648 | 9/1974 | Rose, Jr. et al. | 242/334.1 |
| 3,938,041 | 2/1976 | Louth et al. | 242/357 X |
| 4,001,552 | 1/1977 | Muller | 242/333.1 |
| 4,217,615 | 8/1980 | Suzuki | 360/137 |
| 4,232,371 | 11/1980 | Kamoto | 364/561 |
| 4,280,159 | 7/1981 | Nakayama | 360/137 |
| 4,338,645 | 7/1982 | Mohri et al. | 360/137 |
| 4,352,472 | 10/1982 | Tyrsted | 242/333.1 |
| 4,399,953 | 8/1983 | Macchia | 242/47.08 |
| 4,638,394 | 1/1987 | Hayakawa | 360/137 |
| 4,727,446 | 2/1988 | Kaaden | 360/137 |
| 4,805,053 | 2/1989 | Yamanaka et al. | 360/137 X |
| 4,963,999 | 10/1990 | Utsunomiya et al. | 360/72.3 |
| 4,964,582 | 10/1990 | Hermanns et al. | 242/39 X |
| 4,972,288 | 11/1990 | Nishida | 360/137 |
| 5,276,576 | 1/1994 | Tanaka | 360/137 |

*Primary Examiner*—John Q. Nguyen
*Attorney, Agent, or Firm*—Cesari and McKenna, LLP

[57] ABSTRACT

A tape system that uses a Kalman filter to produce both an estimate of the tape pack radius and an estimate of the associated estimation error variance. The Kalman filter produces the estimates based on current and prior angular estimation position measurements of the reel, capstan, and tension arm, and the prior estimates of both the tape pack radius and the estimation error variance. The filter gain is based on prior estimation error variance and a calculated measurement error variance, which is a function of the current and prior measurements. Preferably, the system uses two Kalman filters, one to produce the estimates for the supply reel and one to produce the estimates for the take-up reel.

20 Claims, 4 Drawing Sheets

SYSTEM FOR ESTIMATING TAPE PACK RADIUS USING A KALMAN FILTER

FIELD OF THE INVENTION

The invention relates to tape systems, and in particular, to systems for determining the tape pack radius of supply and/or take-up reels.

BACKGROUND OF THE INVENTION

Tape systems generally have two reels for storing tape, namely, a supply reel and a take-up reel, a capstan for moving the tape from reel to reel and tension arms for regulating the tape tension. High-performance tape systems also include servo systems, which regulate tape position and velocity. The servo systems rely on estimates of the tape pack radii to determine how to control the rotational speeds of the reels to achieve the desired tape velocity and position. The more accurate the estimates, the more precisely the servo system can control the movement of the tape.

Good estimates of the tape pack radii are fundamentally important in controlling all aspects of the system operations. For example, good estimates are important in determining from which reel to draw the tape to wrap around a scanner. An inaccurate estimate could result in an over-rotation of the selected reel. Further, good estimates are important to determining when to decelerate a high-speed rewind operation, again to avoid over-rotation of one of the reels that may result in the breaking of the tape of the detatchment of the tape from the reel. Also, good estimates are important to determine if there is sufficient tape available on the supply reel to complete a record operation. Inaccurate estimates of the reel pack radii can result in incomplete record operations, if the system sufficiently under estimates the tape position.

In prior known systems the tape pack radius is calculated from measurements of the angular positions of the reels and the capstan. The position measurements are made by, for example, optical encoders that count the number of slots that pass between a photo detector and a light source as the reel rotates. The calculations produce results that are at best as accurate as the position measurements, which tend to be "noisy." With optical encoders, for example, the measurement noise is due in large part to quantitization errors. At slow speeds these systems tend to produce relatively inaccurate results because the position measurements are comparable to the quantitization errors.

Certain prior systems have processed the noisy measurement using low-pass filters, in order to smooth them. However, this approach has two significant problems. First, the signals produced by these filters always lag behind the true tape pack radii, or in other words, the estimates are biased. Second, these filters are slow to converge. Moreover, there is an intrinsic tradeoff—the more the filter smooths the output signals, i.e., the estimates of the tape pack radii, the more lag is introduced into the system and the slower the convergence.

SUMMARY OF INVENTION

The invention is a tape system that uses a Kalman filter to produce both an estimate of the tape pack radius and an estimate of the associated estimation error variance. The Kalman filter produces the estimates based on current and prior angular estimation position measurements of the reel, capstan, and tension arm, and the prior estimates of both the tape pack radius and the estimation error variance. The filter gain is based on the prior estimation error variance and a calculated measurement error variance, which is a function of the current and prior measurements. Preferably, the system uses two Kalman filters, one to produce the estimates for the supply reel and one to produce the estimates for the take-up reel.

More specifically, the Kalman filter includes a model of the dynamics of the system that it uses to predict what the tape pack radius and estimation error variance will be at the time of a new measurement. The Kalman filter then updates the estimate of the tape pack radius when a new measurement is made, based on this predicted radius and a correction factor that is the weighted difference between a "measured" reel pack radius (calculated from reel, capstan, and tension arm measurements) and the predicted radius. This weight, which is Kalman filter gain, is a function of the estimation error variance and a measurement noise, or error variance.

BRIEF DESCRIPTION OF THE DRAWINGS

The above and further advantages of the invention may be better understood by referring to the following description in conjunction with the accompanying drawings, in which.

DETAILED DESCRIPTION

1. The System

Figure 1:
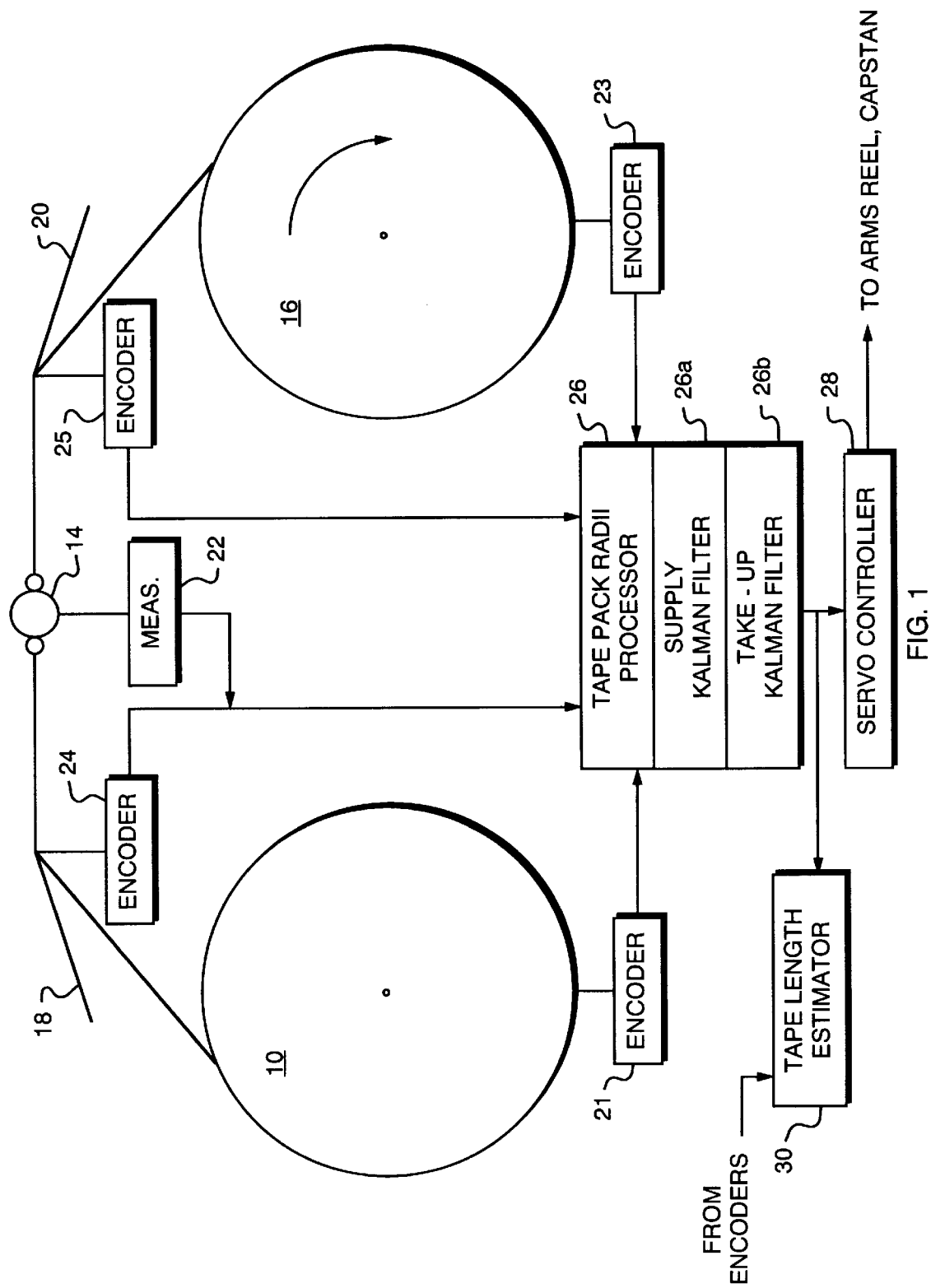
FIG. 1 is a functional block diagram of a system constructed in accordance with the invention.

Referring to FIG. 1, a tape system includes a capstan 14 that transfers tape 12 between a supply reel 10 and a take-up reel 16. When the reels rotate clockwise, as depicted by the arrows, tape is wound off of the supply reel and onto the take-up reel and, thus, the tape pack radius of the supply reel decreases as the tape pack radius of the take-up reel increases.

Angular position transducers 21–25, which may be, for example, optical encoders, are attached to the shafts (not shown) of the capstan 14, the two reels 10 and 16, and the tension arms 18 and 20. The transducers operate in a conventional manner to measure, respectively, the angular positions of the capstan, the reels and the tension arms.

A supply Kalman filter 26a receives measurements from transducers 21, 22 and 24, and a take-up Kalman filter 26b receives measurements from transducers 23, 22, and 25. These measurements are used by the filters to produce estimates of the tape pack radii and estimates of associated estimation error variances, which provide a confidence interval around each tape pack radius estimate. The operations of the filters 26a and 26b are discussed in more detail with reference to FIG. 2 below. Also as discussed in more detail below, the estimates produced by the filters are used by a servo system 28 that controls the motion of and the tension in the tape 12, and by a tape length estimator 30 that determines how much tape is available for a record operation.

The tape system includes other well-known elements such as additional tape guides, scanners, longitudinal heads, and so forth, none of which are shown in the drawing. As long as these elements are fixed in position so that they do not cause the tape path to vary, their presence is immaterial to the operations of the Kalman filters 26a and 26b. The effects on the operations of the filters of a change in the tape path length, for example, by means of movable guides, is discussed below with reference to FIG. 4.

2. The Theory

We can look at the system as two subsystems, namely, a supply subsystem that includes the supply reel 10, the supply tension arm 18 and the capstan 14, and a take-up subsystem that includes the take-up reel 16, the take-up tension arm 20 and the capstan 14. The two subsystems have identical theories of operation, and we discuss herein the theory of operation of the take-up subsystem.

Let us consider the case when position measurements are made at regular short intervals of, for example, 20 milliseconds. If the tape is moving, the length of tape that is wound onto the take-up reel 16 must travel past the capstan 14, and we can state that, to a high degree of accuracy, $$r_r \Delta \theta_r + \mu_a \Delta \theta_a - r_c \Delta \theta_c = 0$$

where $r_r$ is the radius of the take-up reel tape pack, $\Delta \theta_r$ is the change in angular position of the take-up reel 16 from the previous sample time to the current sample time, $\Delta \theta_c$ is the change in angular position of the capstan, $\mu_a$ is a gain determined by the geometry of the tape path and the nominal position of the take-up tension arm 20, and $\Delta \theta_a$ is the change in angular position of the arm. The radius of the take-up reel is thus:

$$r_r = \frac{r_c \Delta \theta_c - \mu_a \Delta \theta_a}{\Delta \theta_r} \qquad \text{eqn. 1}$$

If the tape is moving relatively slowly the "deltas," that is, the changes in the angular positions are comparable in magnitude to the position measurement errors. If the system relies solely on these measurements to determine tape pack radius and ignores both past measurements and the dynamics of the system, errors in position measurements translate directly to inaccuracies in the determination of the tape pack radius. The prior systems discussed above in the Background section all suffer from this problem.

Our system circumvents those problems through the use of a Kalman filter, which has as an input signal a "measured" radius $r_m$, that is calculated using equation 1. The Kalman filter incorporates a model of how the tape pack radius changes as a function of reel position to predict an estimated tape pack radius. The filter then uses the measured radius to correct this prediction. The derivation of the predictive model is considered here.

Consider the tape pack as a hollow, circular cylindrical mass with width "W", and a uniform density "d," i.e. mass per unit volume, where d is the density of the tape itself. If a length of tape "I" units long, with width w and thickness "δ" is wound onto the reel, the mass of the tape pack increases by the mass of that length of tape, and the radius of the tape pack increases accordingly.

The mass of the tape pack before the length of tape is wound on is:

$$dw\pi r_1^2 - dw\pi r_0^2$$

where $r_1$ is the outer radius of the tape pack and $r_0$ is the inner radius of the tape pack, i.e., the radius of the reel hub. Suppose that the radius of the pack increases to $r_2$ when the length of tape is wound onto the tape pack. The mass of the tape pack thus increases to:

$$dw\pi r_2^2 - dw\pi r_0^2 \qquad \text{eqn. 2}$$

The increase in the mass of the tape pack due to the tape being wound onto the reel is $dwl\delta$, which is the mass of the additional tape, hence:

$$dw\pi r_2^2 - dw\pi r_0^2 = dw\pi r_1^2 - dw\pi r_0^2 + dwl\delta.$$

Solving for $r_2$ we have:

$$r_2 = \left( r_1^2 + \frac{1}{\pi} l\delta \right)^{\frac{1}{2}} \qquad \text{eqn. 3}$$

Given an initial reel radius $r_1$ this equation enables us to approximately predict what the radius will be after we wind on the additional tape of length I. What we are really interested in, however, is an equation that allows us to predict what the radius will be given an initial reel radius and an amount by which the reel rotates. If the reel rotates in the clockwise direction by a small amount $\Delta \theta_r$ and the reel radius is initially r, a length of tape equal to $r\Delta \theta_r$ is wound onto the tape pack and the tape pack radius increases by $\Delta r$, which according to eqn. 3 satisfies:

$$r + \Delta r = \left( r^2 + \frac{1}{\pi} r \Delta \theta_r \delta \right)^{\frac{1}{2}} \qquad \text{eqn. 4}$$

$$= r \left( 1 + \frac{\Delta \theta_r \delta}{\pi r} \right)^{\frac{1}{2}}$$

$$\approx r \left( 1 + \frac{\Delta \theta_r \delta}{2\pi r} \right),$$

hence $$\Delta r = \frac{\Delta \theta_r \delta}{2\pi r}$$

and, in the limit, $$\dot{r} = \frac{\delta}{2\pi} \dot{\theta}_r$$

The desired predictive equation is the integral of eqn. 4, from an initial time $t_0$ to the time $t_f$ for which the prediction is required:

$$r(t_f) - r(t_0) = \frac{\delta}{2\pi} [\theta_r(t_f) - \theta_r(t_0)]$$

where $r(t_i)$ is the tape pack radius at time $t_i$, and $\theta_r(t_i)$ is the angular position of the take-up reel at time $t_i$. Thus:

$$r(t_f) = r(t_0) + \frac{\delta}{2\pi} [\theta_r(t_n) - \theta_r(t_0)] \qquad \text{eqn. 5}$$

Inaccuracies in this model are accounted for in the Kalman filter by an estimate of "noise" applied to the system—that is, by quantifying as applied noise essentially unmeasurable attributes of the system dynamics. The applied noise is one of the factors that is used in determining the Kalman filter gain, k, as discussed below with reference to FIGS. 2 and 3.

To determine the filter gain, the system also requires an estimate of the measurement noise, or error, variance. The system implicitly assumes that the errors in the various position measurements can be represented by independent, zero-mean random variables $\epsilon_i$, which each have "small" variances. We know that for a smooth (differentiable) function g that maps "n" real numbers to one real number, we have:

$$\text{var}(g(x_1 + \varepsilon_1, \ldots, x_n + \varepsilon_n)) \approx \left(\left(\frac{\partial g}{\partial x_1}(x)\right)^2 \text{var}(\varepsilon_1) + \ldots + \left(\frac{\partial g}{\partial x_n}(x)\right)^2 \text{var}(\varepsilon_n)\right)$$

From this relation we obtain the approximate measurement noise variance. Based on equation 1, we define the function g as:

$$g(\theta_c, \theta_{c-}, \theta_a, \theta_{a-}, \theta_r, \theta_{r-}) = \frac{r_c(\theta_c - \theta_{c-}) - \mu_a(\theta_a - \theta_{a-})}{\theta_r - \theta_{r-}}$$

where $\theta_c$ is the position of the capstan at the current sample time, $\theta_{c-}$ is the position of the capstan at the previous sample time, $\theta_a$ and $\theta_{a-}$ are the positions of the tension arm at the current and previous sample times, and $\theta_r$ and $\theta_{r-}$ are the positions of the take-up reel at the current and previous sample times. If these quantities are perturbed, respectively, by independent, zero-mean random variables $\epsilon_c$, $\epsilon_a$ and $\epsilon_r$, the approximate measurement error variance $\sigma_m^2$ is:

$$\sigma_m^2 = \frac{2}{\theta_r - \theta_{r-}} [r_c^2 \text{var}(\varepsilon_c) + \mu_a^2 \text{var}(\varepsilon_a) + g(\theta_c, \theta_c, \theta_a, \theta_{a-}, \theta_r, \theta_{r-})^2 \text{var}(\varepsilon_r)] \quad \text{eqn. 6}$$

The variances var($\epsilon_c$), var($\epsilon_a$) and var($\epsilon_r$) are computed by assuming that the quantitization error is a random variable with zero mean that is uniformly distributed over an interval of size $$\frac{2\pi}{n}$$

radians, where N is the number of encoder counts per revolution.

The system ignores measurements that it determines to be unreasonable. As discussed below with reference to FIG. 3, the system considers a measurement to be unreasonable if the associated measurement error variance, $\sigma_m^2$, is greater than the maximum variance $\sigma_{max}^2$, or if the three-sigma measurement interval around the calculated measured radius $r_m$, as determined by the measurement model, is not at least partially included within the interval from the minimum tape pack radius, $r_{min}$, to the maximum tape pack radius, $r_{max}$. Ignoring the unreasonable measurements greatly improves the robustness of the Kalman filter to capstan slip.

The Kalman filters use equations 1 and 6 to produce estimates of the tape pack radii and the associated measurement error variances, respectively, as discussed below.

3. System Operation

Figure 2A:
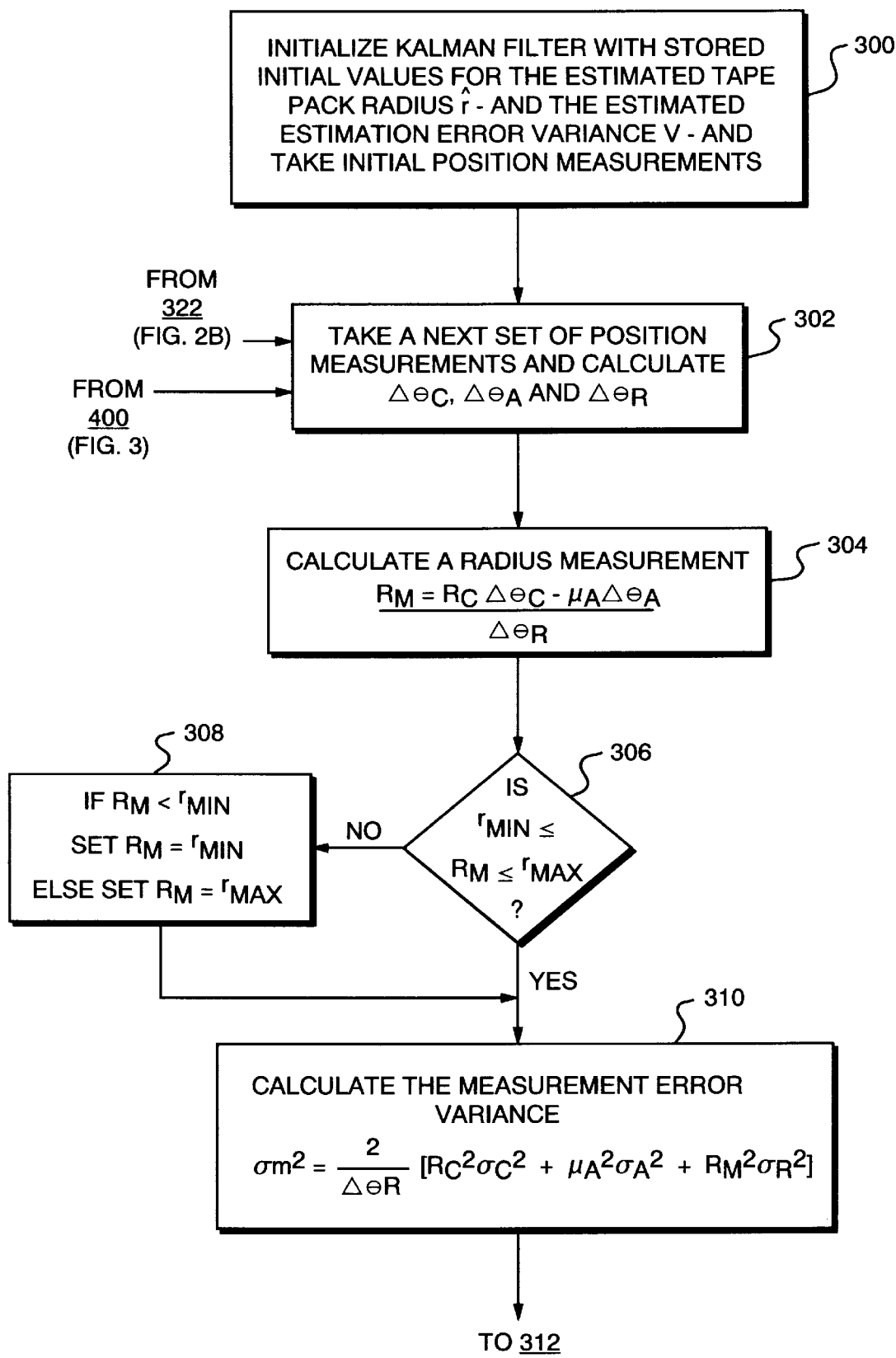
FIG. 2 is a flowchart of the operations of the system of FIG. 1.
Figure 2B:
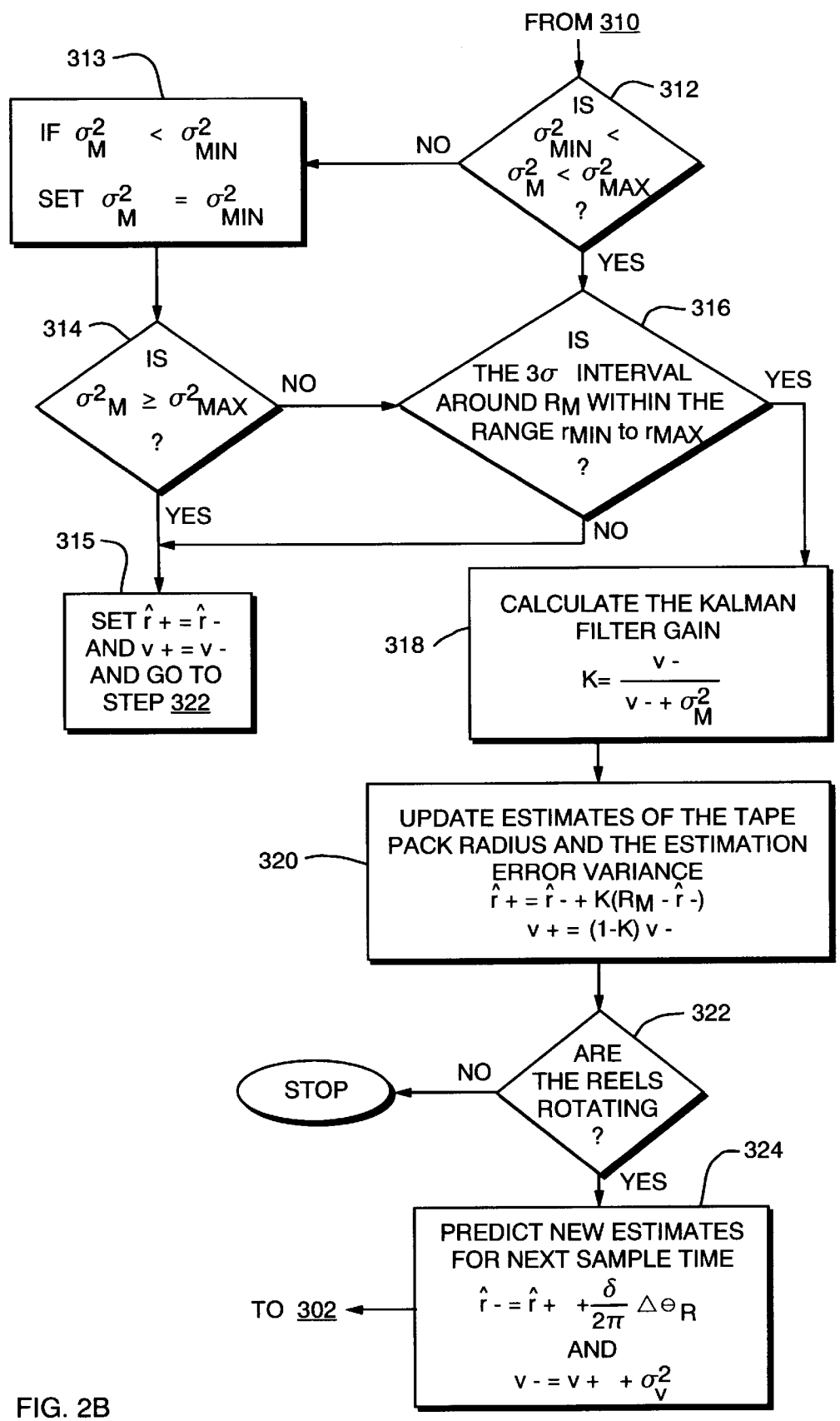
Figure 3:
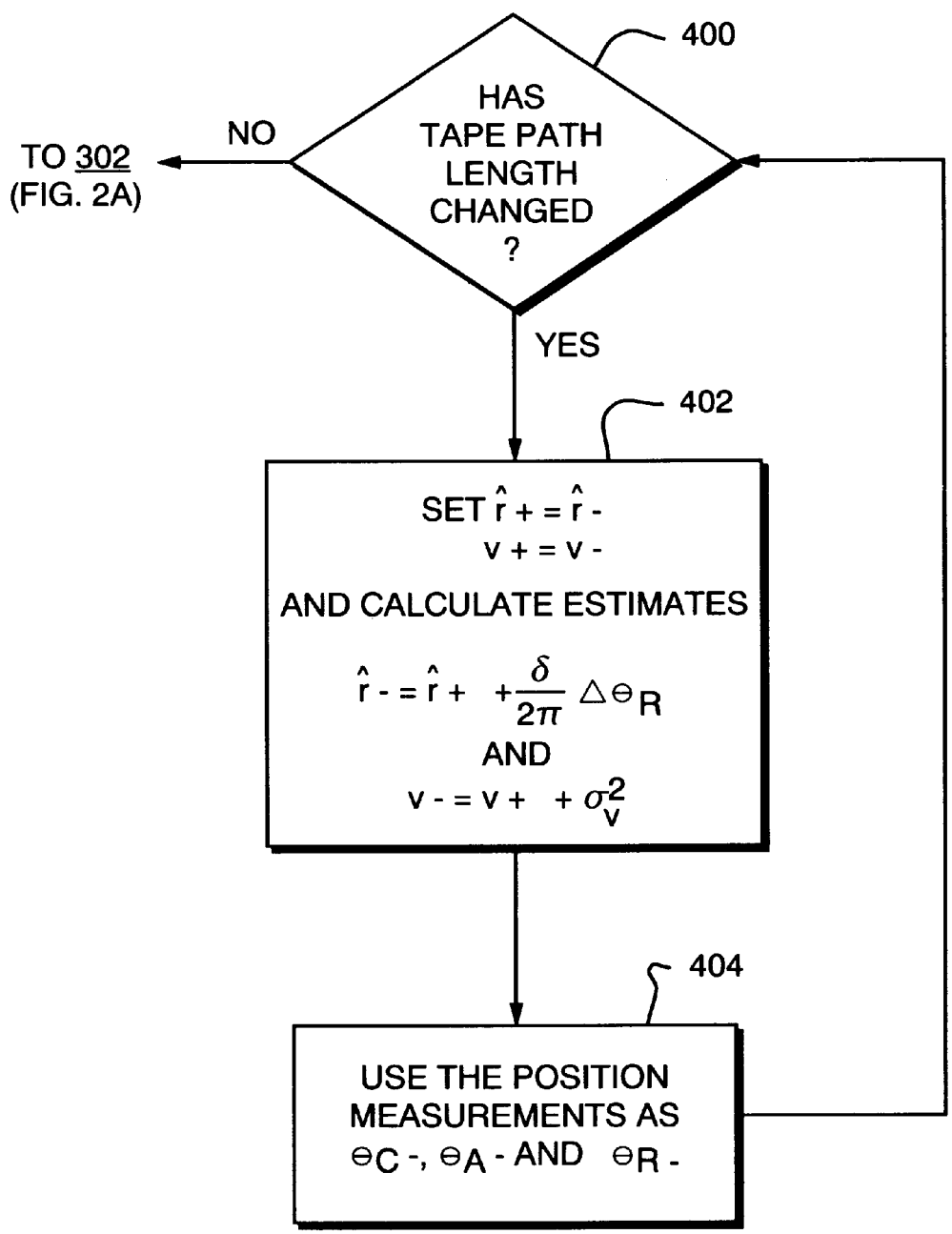
FIG. 3 is a flowchart of the operations of the system of FIG. 1 when the system is operating in a coasting mode.

Referring now to FIGS. 1 and 2, when a tape, for example, a cassette tape, that is wound on the supply and take-up reels 10 and 16, is loaded into the system, the system has no indication of the tape pack radii. Accordingly, the tape pack radii processor 26 in step 300 must initialize the Kalman filter with (1) an initial tape pack radius estimate, (2) an initial estimation error variance and (3) initial position measurements of the capstan, the tension arm, and the reel, that is, $\theta_c$, $\theta_a$, and $\theta_r$, where $\theta_r$ is the angular position of the tape reel under consideration, for example, the take-up reel. We discuss below the operations of the system in determining the tape pack radius of the take-up reel 16. The system performs the same operations to produce estimates of the tape pack radius of the supply reel 10 and the associated estimation error variance.

The processor 26 uses as the initial estimate of the tape pack radius:

$$\hat{r}^- = \frac{r_{max} + r_{min}}{2}$$

which is the radius when one-half of the tape is wound on the reel, and uses as an estimate of the initial estimation error variance:

$$v^- = \frac{(r_{max} - r_{min})^2}{12}$$

which is the variance of a uniformly distributed variable over the interval $r_{min}$ to $r_{max}$. This initial estimate of the error variance is relatively large and indicates that the initial estimate of the tape pack radius is very likely to be inaccurate.

The processor 26 takes a next set of position measurements $\theta_c$, $\theta_a$, and $\theta_r$, and calculates $\Delta\theta_c$, $\Delta\theta_a$ and $\Delta\theta_r$, using the initial set of measurements as the measurements of the previous sample time, namely, $\theta_{c-}$, $\theta_{a-}$ and $\theta_{r-}$ (step 302).

Using these delta values, the processor, in step 304, calculates a "measured" radius, $r_m$:

$$r_m = \frac{r_c \Delta\theta_c - \mu_a \Delta\theta_a}{\Delta\theta_r}$$

The processor, in step 306, next determines if the calculated radius falls outside of the interval of possible radii, namely, the interval $r_{min}$ to $r_{max}$. If so, the processor sets the calculated $r_m$ to $r_{min}$ if $r_m$ is less than $r_{min}$, or to $r_{max}$ if $r_m$ is greater than $r_{max}$ (step 308).

The system then in step 310 calculates a measurement error variance $\sigma_m^2$, using the measured $\Delta\theta_r$ and the calculated radius $r_m$:

$$\sigma_m^2 = \frac{2}{\Delta\theta_r} [r_c^2 \text{var}(\varepsilon_c) + \mu_a^2 \text{var}(\varepsilon_a) + r_m^2 \text{var}(\varepsilon_r)]$$

If the calculated measurement error variance is larger than the maximum estimation error variance, which is determined by equation 7, the processor determines that the angular position measurements are unreasonable (steps 312, 314).

Assuming the calculated measurement error variance is not greater than the maximum estimation error variance, the processor further tests the reasonableness of the measurements by determining if at least a portion of the three sigma interval around $r_m$ is within the interval of $r_{min}$ to $r_{max}$ (step 316). If so, the processor determines that the measurements are reasonable, and uses the calculated radius $r_m$ and measurement error variance $\sigma_m^2$ in the Kalman filter to determine estimates of the tape pack radius and the estimation error variance. Otherwise, the system determines that the measurements are unreasonable and, as discussed below, uses predicted values for the estimates.

If the measurements are reasonable, the processor, in step 318, calculates the Kalman filter gain, k, as:

$$k = \frac{v^-}{v^- + \sigma_m^2}$$

where $v^-$ is the estimation error variance extrapolated from the previous sample time. The processor next, in step 320, updates the estimate of the tape pack radius as:

$$\hat{r}^+ = \hat{r}^- + k(r_m - \hat{r}^-)$$

and updates the estimation error variance as:

$$v^+ = \frac{(1-k)}{v^-}$$

These updated estimates are the output signals of the filter. The servo controller 28 and a tape length counter (not shown) then use these estimates to determine how to control the tape system, as discussed below. Next, the tape pack radius and estimation error variance are propagated to the next sample time. The radius estimate is propagated according to the predictive equation:

$$\hat{r}^- = \hat{r}^+ + \frac{\delta}{2\pi}\Delta\theta_r,$$

which comes from equation 5, and the estimation error variance is propagated according to the equation:

$$v^- = v^+ + \sigma_v^2,$$

where $\sigma_v^2$ is a constant that represents the inaccuracies of, or the noise applied to, the predictive model.

The servo controller 28 uses the estimated tape pack radii in conventional feedback and feed-forward loops that control the rotational speeds of the reels and move the tape at a desired velocity. The tape length estimator 30, which determines how much tape is available for record operations, uses as a lower bound for the tape pack radii:

$$\hat{r}^+ - 3\sigma.$$

This is a conservative estimate, which prevents the tape length estimator from over estimating the length of the tape available for a given record operation.

If the processor 26 determines that the measurements are unreasonable, it does not update the filter gain. Further, it does not calculate the updated estimates. Instead, it predicts what the estimates should be based solely on the previous estimates. The processor, in step 315, sets $\hat{r}^+ = \hat{r}^-$ and $v^+ = v^-$ and predicts an estimate of the tape pack radius $\hat{r}^-$ as:

$$\hat{r}^- = \hat{r}^+ + \frac{\delta}{2\pi}\Delta\theta_r$$

and the error variance $v^-$ as:

$$v^- = v^+ + \sigma_v^2$$

The processor then sets the measured values $\theta_c$, $\theta_a$ and $\theta_r$ as the prior values $\theta_{c-}$, $\theta_{a-}$, and $\theta_{r-}$, respectively, and repeats steps 302–320 to calculate updated estimates for the next sample time.

The system continues to determine and, as appropriate, predict estimates for the tape pack radii and the associated error variances as long as estimates are required, that is, as long as the reels continue to rotate.

Referring now to FIG. 4, the processor operates in a "coasting" mode when the tape path length is altered by anything but the tension arm. For example, the system operates in the coasting mode when the tape is being unwound from one reel and wrapped around the scanner (not shown). The system also operates in a coasting mode when the tape is being withdrawn from the scanner. These operations, which significantly change the length of the tape path, are not included in the underlying assumptions upon which the measurement model in the Kalman filter is based. Accordingly, the measured radius $r_m$ produced by that model cannot be used to determine the estimates of the tape pack radius and the error variance when the path length is so altered. The estimates are instead produced using the predictive model.

The system thus extrapolates from the current estimates of tape pack radius and estimation error variance to the next sample time by taking a next set of position measurements (step 402), determining $\Delta\theta_c$, $\Delta\theta_a$ and $\Delta\theta_r$ (step 404) and estimating the tape pack radius by:

$$\hat{r}^- = \hat{r}^+ + \frac{\delta}{2\pi}\Delta\theta_r$$

and the error variance by $$v^- = v^+ + \sigma_v^2$$

where $\sigma_v^2$ is a constant that represents the inaccuracies in the predictive model (step 406). It next, in step 408, sets $\theta_{c-}$, $\theta_{a-}$ and $\theta_{r-}$ equal to the measured values and $\hat{r}^+ = \hat{r}^-$ and $v^+ = v^-$, and at the next sample time again begins the process of predicting the estimates. The system thus returns to step 402.

The processor continues operating in the coasting mode while the system is varying the tape path length. Once the tape path length is held constant, the processor again utilizes the filter gain, and operates as discussed above with reference to FIG. 3.

Generally, the system operates in the coasting mode for only a small number of consecutive sample times. By predicting new radii and estimation error variance values during the coasting operations, the processor can determine at the end of these operations reliable updated estimates for the tape pack radii and error variance, as well as a reliable filter gain, which is based in part on these estimates.

While the measurement model could be revised to include the system operations in which the path length is varied, it is not necessary since the time the system spends so little time performing these operations. Thus, the trade off of increased complexity in the model for more accuracy during these limited path-varying operations seems unwarranted. Further, since the estimates produced by the Kalman filter converge rapidly, the accuracy of the system is only minimally reduced by not including in the model the path-varying operations.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A system for estimating tape pack radius, the system including:
   a. a tape supply reel;
   b. a tape take-up reel;
   c. a capstan for controlling tape transfer between the reels;
   d. senisors for measuring the angular position of the capstan and one or both of the reels during sample times;
   e. measurement model means for determining a measured radius $R_M$ of a given reel in a sample time based on the position measurements associated with the given reel;

f. predictionl model means for determining an updated estimate of the tape pack radius of the given reel in a sample time as:

$$\hat{r}^+ = \hat{r}^- + K(R_M - \hat{r}^-)$$

where $$\hat{r}^-$$

is a predicted estimate of the radius of the given reel calculated by propagating the estimated radius at a previous sample time to the current sample time as $$\hat{r}^- = \hat{r}^+ + \frac{\delta}{2\pi}\Delta\theta_r,$$

and K is a Kaliman filter gain factor that is based on an estimated error variance associated with a previous estimate of the radius of the given reel, $\delta$ is tape thickness and $\Delta\Theta$, is a change in the angular position of the given reel from the previous sample time to the current sample time.

2. The system of claim 1 wherein
i. the measurement model means further calculates a measurement error variance $$[\sigma_m^2 as]\sigma_m^2 = \frac{2}{\Delta O_r}(r_c^2 \text{var}(\varepsilon_c) + \mu_a^2 \text{var}(\varepsilon_a) + R_m^2 \text{var}(\varepsilon_r)),$$

where $\epsilon_c$, $\epsilon_a$ and $\epsilon_r$, are independent, zero-mean random variables associated, respectively, with the capstan, a tension arm included in a tape path between the two reels, and the given reel, $\mu_A$ is a gain determined by the geometry of the tape path, and $r_c$ is the radius of the capstan; and ii. the prediction model means further
  a. updates the Kalman filter gain K based on the calculated measurement error variance $\sigma_m^2$ and the estimated error variance associated with the previous estimate of the tape pack radius, and
  b. calculates a estimated error variance $v^+$ for the current estimated tape pack radius as $v^+ = (1-K)^-$, the prediction model means propagating the error variance to a next sample time as $v^- = v^+ + \sigma_v^2$ where $\sigma_v^2$ is a constant that represents noise inherent in the system.

3. The system of claim 2 wherein the prediction model means calculates the filter gained as $$K = \frac{v^-}{v^- + \sigma_m^2}.$$

4. the system of claim 3 wherein:
a. the sensors measure the angular position of the tension arm, and
b. the measurement model means uses the tension arm position measurements in the determination of the measured radius $R_M$.

5. The system of claim 2 wherein the prediction model means
a. determines if position measurements are unreasonable by determining if a three signal interval around $R_M$ is outside of an interval between predetermined minimum and maximum radius thresholds $r_{min}$ and $r_{max}$; and
b. if so, propagates the estimate $$\hat{r}^-$$

of the tape pack radius that is to be used in calculating the estimate at a next sample time in which the measurements are reasonable by setting $$\hat{r}^+ = \hat{r}^-$$

and calculating the predicted estimate as:

$$\hat{r}^- = \hat{r}^+ + \frac{\delta}{2\pi}\Delta\Theta_R$$

where $\delta$ is the width of the tape supplied to the given reel and $\Delta\theta_R$ is the chance in angular position of the given reel from the previous sample time to the current sample time.

6. The system of claim 5 wherein the prediction model means, for unreasonable measurements, produces an estimate of the error variance that is to be used in updating the estimated error variance at a next sample time in which the position measurements are reasonable by setting $$v^+ = v^-$$

and calculating $$v^- = v^+ + \sigma_v^2$$

where $\sigma_v^2$ is a constant that represents noise inherent in the system.

7. The system of claim 6 wherein the prediction model means
a. calculates the filter gain as $$K = \frac{v^-}{v^- + \sigma_m^2}$$

8. A system for estimating tape pack radius, the system including:
a. a tape supply reel;
b. a tape take-up reel;
c. a capstan or controlling tape transfer between the reels;
d. means for measuring, the angular position of one or both of the reels and the capstan;
e. a measurement model means for calculating for a given reel a measured tape pack radius value $R_M$ that is based on the position measurements associated with the given reel,
f. a prediction model means for
  i. determining a calculated measurement error variance associated with the measured tape pack radius value,
  ii. determining a filter gain factor, K, based on the calculated measurement error variance, and
  iii. estimating for a given sample lime the tape pack radius of a given reel as $$\hat{r}^+ = \hat{r}^- + K(R_m - \hat{r}^-)$$

where $\hat{r}^-$ is a predicted estimate of the radius of the given reel calculated by propagating the estimated radius for the previous sample time to the current sample time as $$\hat{r}^- = \hat{r}^+ + \frac{\delta}{2\pi}\Delta\theta_r,$$

and K is a Kalman filter gain factor that is based on an estimated error variance associated with a previous estimate of the radius of the given reel, $\delta$ is tape thickness and $\Delta\Theta_r$ is a change in the angular position of the given reel from the previous sample time to the current sample time, and g. controls means for controlling, the capstan to adjust speed of the winding and unwinding operations based on the estimated tape pack radius.

9. The system of claim 8 wherein
the prediction model means determines a lower bound for the estimate of the tape pack radius as the radius decreases three sigma below the estimated radius, and the control means further includes means for determining how close the calculated lower bound value is to a value that corresponds to the end of the tape, said control means controlling the capstan to adjust the speed of the unwinding of the tape from the tape pack.

10. The system of claim 9 wherein the system uses the lower bound to determine if the tape pack includes enough tape to perform a recording operation.

11. A method for estimating tape pack radius in a tape system, the method including:

a. setting an estimated error variance $v^-$ and a predicted estimated tape pack radius $\hat{r}^-$ to predetermined initial values;

b. measuring the angular position of a first tape reel and a capstan during a sample time;

c. determining a measured radius $R_M$ of the first reel based on the position measurements;

d. calculating a measurement error variance and determining if the variance is below a predetermined maximum;

e. if the calculated measurement error variance is below the predetermined maximum, calculating Kalman filter gain K based on the estimated error variance and the calculated measurement error variance;

f. determining an updated estimate of the tape pack radius of the first reel as:

$$\hat{r}^+ = \hat{r}^- + K(R_M - \hat{r}^-);$$

g. predicting an estimated tape pack radius $\hat{r}^-$ for a next sample time as $$\hat{r}^- = \hat{r}^+ + \frac{\delta}{2\pi}\Delta\theta_r,$$

where $\delta$ is tape thickness and $\Delta\Theta_r$ is the change in angular position of the first reel from the previous sample time to the current sample time;

h. updating the estimated error variance as $v^+=(1-K)v^-$ and propagating the error variance to a next sample time as $v^-=v^++\sigma_v^2$ where $\sigma_v^2$ is a constant that relates to noise inherent in the system;

i. controlling the winding operations of the system based on the estimated tape pack radius; and j. repeating steps b–i.

12. The method of claim 11 further including the steps of:

k. if the calculated measurement error variance is above the predetermined maximum, setting the estimated radius to $$\hat{r}^+ = \hat{r}^-$$

and calculating the predicted estimated radius for a next sample time as $$\hat{r}^- = \hat{r}^+ + \frac{\delta}{2\pi}\Delta\theta_r;$$

l. propagating the estimated error variance to a next sample time $^-$ by setting $v^+=v^-$ and calculating $v^-=v^++\sigma_v^2$ where $\sigma_v^2$ is a constant that relates to noise inherent in the system.

13. The method of claim 12 wherein the step of controlling the operations of the system includes setting the speed of winding or unwinding operations.

14. The method of claim 13 wherein the step of setting the speed of winding or unwinding operations is based, respectively, on how close an upper or lower bound of a three signal interval around the estimated tape pack radius is to an end of the tape.

15. The method of claim 12 wherein the step of controlling the operations of the system includes determining if sufficient tape remains on the reel to perform a given recording operation.

16. A method for estimating tape pack radius in a tape system, the method including:

a. measuring the angular position of a first tape reel and a capstan;

b. determining a measured radius $R_M$ of the first reel based on tile position measurements;

c. determining an updated estimate of the tape pack radius of the first reel as:

$$\hat{r}^+ = \hat{r}^- + K(R_M - \hat{r}^-)$$

where K is a Kalman filter gain that is based on an estimated error variance associated with the previous estimate of the radius and $\hat{r}^-$ is a predicted estimate of the radius calculated by propagating the estimated radius from the previous sample time to the current sample time as $$\hat{r}^- = \hat{r}^+ + \frac{\delta}{2\pi}\Delta\theta_r,$$

$\delta$ is tape thickness and $\Delta\Theta_r$ is the change in angular position of the first reel from the previous sample time to the current sample time.

17. The method of claim 16 further including the steps of:
a. calculating a measurement error variance $\sigma_m^2$ as $$\sigma_m^2 = \frac{2}{\Delta\Theta_r}(r_c^2\text{var}(\varepsilon_c) + \mu_a^2\text{var}(\varepsilon_a) + R_m^2\text{var}(\varepsilon_r)),$$

where $\epsilon_c$, $\epsilon_a$ and $\epsilon_r$ are independent, zero-mean random variables associated respectively with the capstan, a tension arm in a tape path between the first reel and a second tape reel, and the fist reel,
$r_c$ is the radius of the capstan and $\mu_a$ is a gain associated with the geometry of the tape path;
b. updating the Kalman filter gain as $$K = \frac{v^-}{v^- + \sigma_m^2},$$

where $v^-$ is an estimated error variance associated with the previous estimate of the tape pack radius, and
c. calculating an updated estimated measurement error variance $v^+$ for the current sample time as $v^+=(1-K)v^-$ and propagating the estimated error variance to the next sample time as $v^-=v^++\sigma_v^2$ where $\sigma_v^2$ represents noise inherent in the system.

18. The method of claim 17 further including the steps of:
i. measuring the angular position of the tension arm, and
ii. using the measurement of angular position of the tension arm in the determination of the measure radius $R_M$.

19. The system of claim 17 further including the steps of:
i. deternining if position measurements are unreasonable by determining if a three sigma interval around $R_M$ is outside of an interval between predetermined minimum and maximum radius thresholds $r_{min}$ and $r_{max}$; and
ii. if so, propagating the estimated tape pack radius $$\hat{r}^{\hat{-}}$$

that is to be used in calculating the estimate at a next sample time in which the measurements are reasonable by setting $$\hat{r}^+ = \hat{r}^{\hat{-}}$$

and calculating $$\hat{r}^{\hat{-}} = \hat{r}^+ + \frac{\delta}{2\pi}\Delta\Theta_R.$$

20. The method of claim 19 further including in the step of
updating the estimated error variance for unreasonable measurements by setting $v^+=v-$ and calculating $v^+=v^++\sigma_v^2$.

* * * * *